United States Patent [19]

Anderson

[11] Patent Number: 4,817,434
[45] Date of Patent: * Apr. 4, 1989

[54] DEVICE FOR IMAGING THREE DIMENSIONS USING SIMULTANEOUS MULTIPLE BEAM FORMATION

[76] Inventor: Forrest Anderson, P.O. Box 1400, Bernalillo, N. Mex. 87004

[*] Notice: The portion of the term of this patent subsequent to Aug. 25, 2004 has been disclaimed.

[21] Appl. No.: 86,588

[22] Filed: Aug. 17, 1987

Related U.S. Application Data

[63] Continuation-in-part of Ser. No. 799,424, Nov. 19, 1985, Pat. No. 4,688,430.

[51] Int. Cl.$^4$ ............................................. G01N 29/04
[52] U.S. Cl. ......................................... 73/625; 73/626
[58] Field of Search ................. 73/625, 626, 603, 606, 73/597, 628; 128/660

[56] References Cited

U.S. PATENT DOCUMENTS

| | | |
|---|---|---|
| Re. 30,397 | 9/1980 | King . |
| 3,676,584 | 7/1972 | Plakas . |
| 3,717,843 | 2/1973 | Farrah et al. . |
| 3,918,025 | 11/1975 | Koskikawa et al. . |
| 4,131,022 | 12/1978 | Mezerich . |
| 4,332,016 | 5/1982 | Berntsen . |
| 4,395,909 | 8/1983 | Stienberg et al. . |
| 4,688,430 | 8/1987 | Anderson ............................. 73/625 |
| 4,706,499 | 11/1987 | Anderson ............................. 73/625 |

OTHER PUBLICATIONS

S. Bennett et al., "A Real Time Synthetic Aperture Digital Imaging System", Acoustical Imaging, V10, 1982.
K. Liang et al., "A Three Dimensional Synthetic Focus System" Acoustical Imaging, V10, 1982.
K. Nitadori, "An Experimental Underwater Acoustic Imaging System . . . ", Acoustical Imaging, V8, 1980.
K. Nitadori, "Synthetic Aperture Approach to Multibeam Scanning", Acoustical Imaging, V6, 1975.
P. Corl et al., "A Digital Synthetic Focus Acoustic Imaging System", Acoustical Imaging, V8, 1980.
R. Koppelman, "Three Dimensional Acoustic Imaging", Acoustical Imaging, V8, 1980.
B. Hildebrand, "An Analysis of Pulsed Ultrasonic Arrays", Acoustical Imaging, V8, 1980.
K. Liang et al., "A 50 MHz Synthetic Focus System", Acoustical Imaging, V11, 1982.
G. Sackman et al., "Acoustic Imaging in Marine Sediment . . . ", Acoustical Imaging, V11, 1982.
S. A. Johnson, J. F. Greenleaf et al., "Digital Computer Study of a Real Time . . . ", Acoustical Imaging, V8, 1975.

Primary Examiner—Stewart J. Levy
Assistant Examiner—Lawrence Fess

[57] ABSTRACT

A method and apparatus for three dimensional imaging of a solid angular volume utilizing a single pulse of radiated energy is described. An embodiment is disclosed which utilizes a single unipolar acoustic pulse to insonify a three dimensional volume. An array of transducers is used to collect the echoes which are stored in a memory as a replica of the reflected three dimensional wavefield. This data is processed to form a replica of the three dimensional volume of objects responsible for the echoes which is then stored in a second three dimensional memory. The data in this memory is collapsed in the direction of preferred perspective to enable viewing on a cathode ray tube.

24 Claims, 13 Drawing Sheets

SIMPLIFIED ECHO BUFFER MEMORY
ELEMENT 1 ECHO DATA 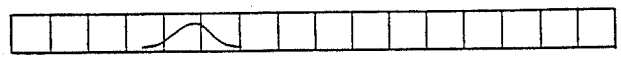
ELEMENT 2 ECHO DATA 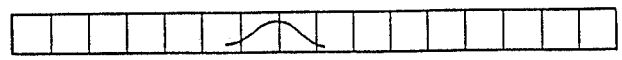
ELEMENT 3 ECHO DATA 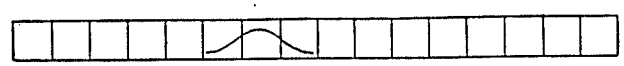
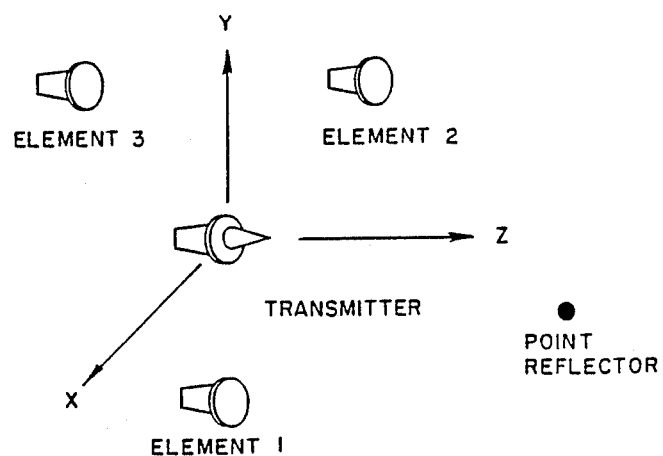
FIG-2

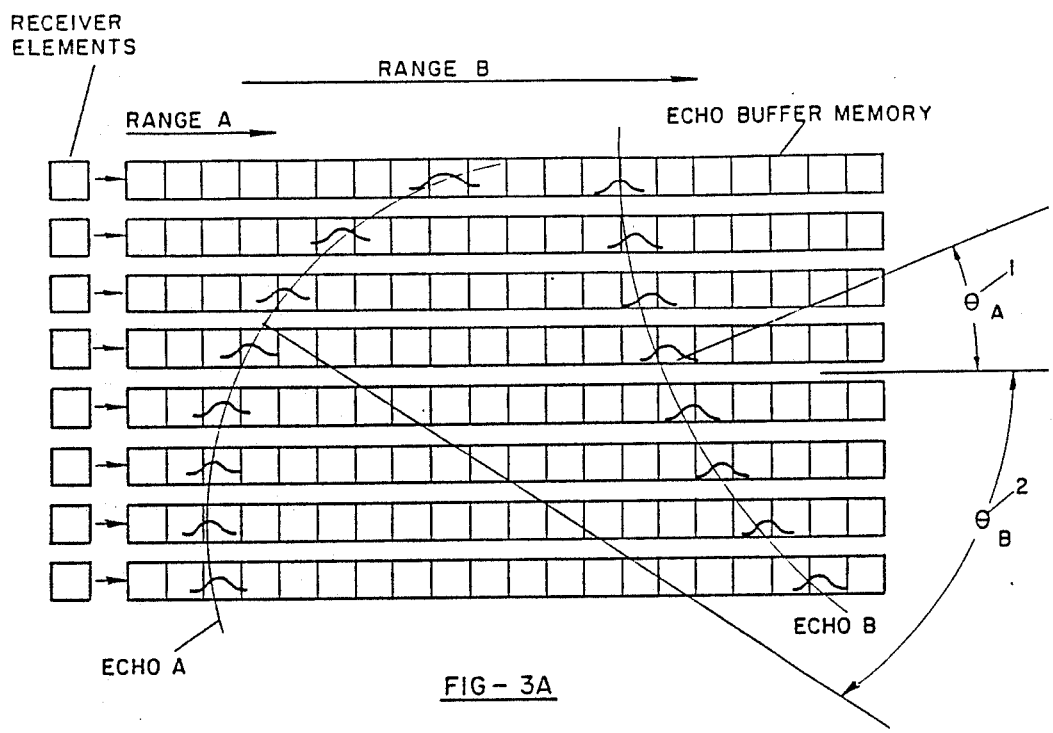
FIG-3A
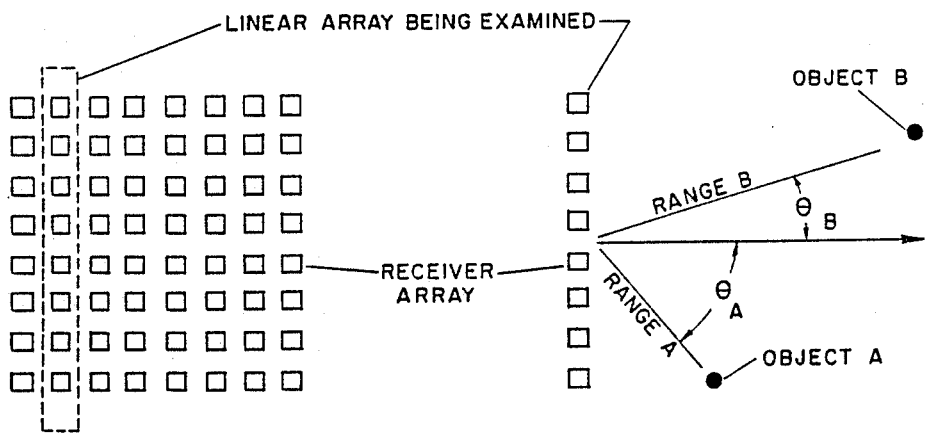
FIG-3B
FIG-3C

MULTICYCLE PULSES —
CONVERSION TO UNIPOLAR
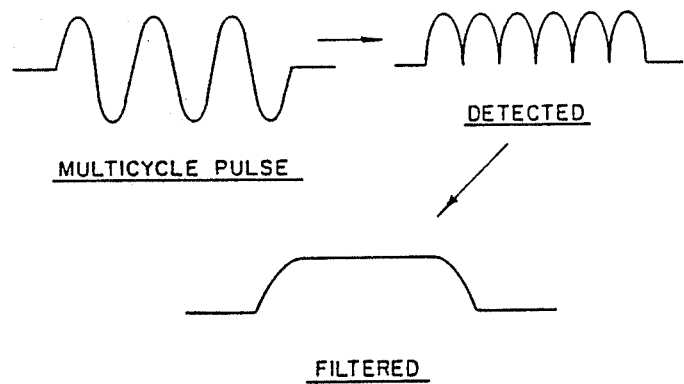
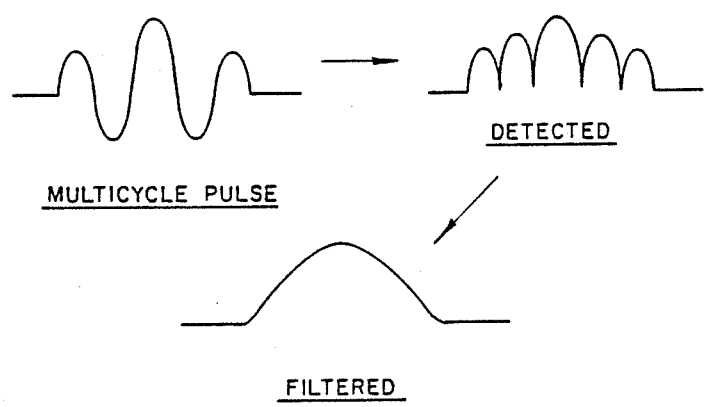
FIG—6

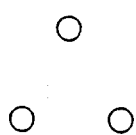
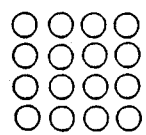
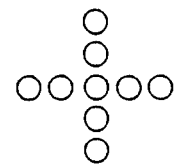
FIG-8A    FIG-8B    FIG-8C
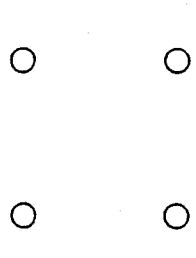
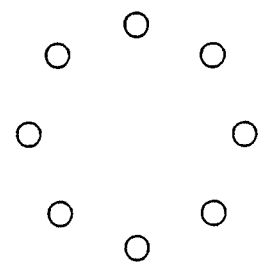
FIG-8D    FIG-8E

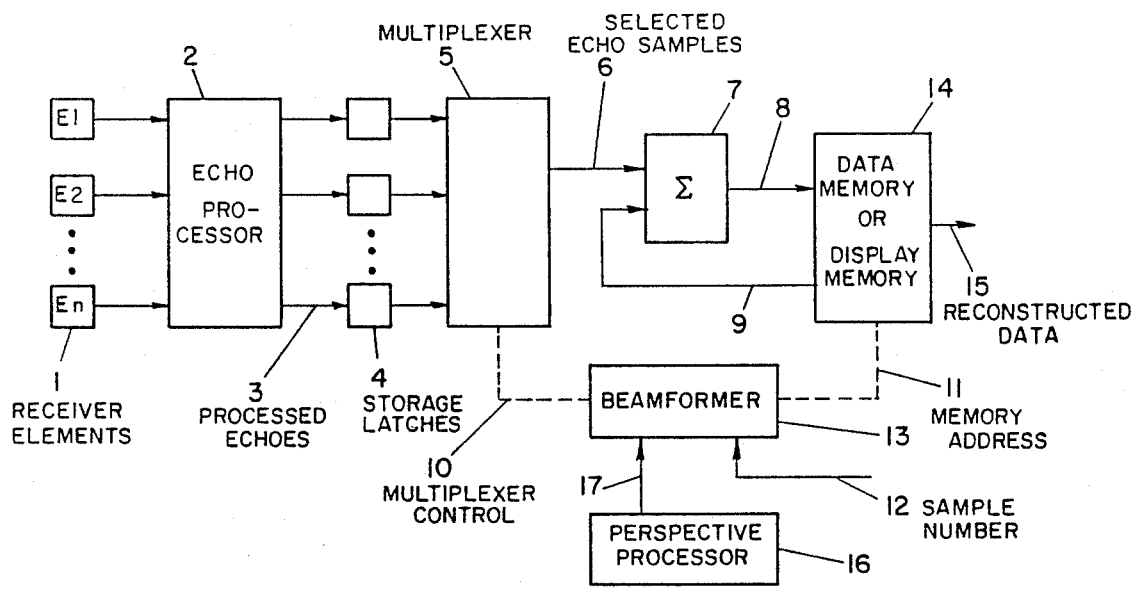
*FIG—9a*
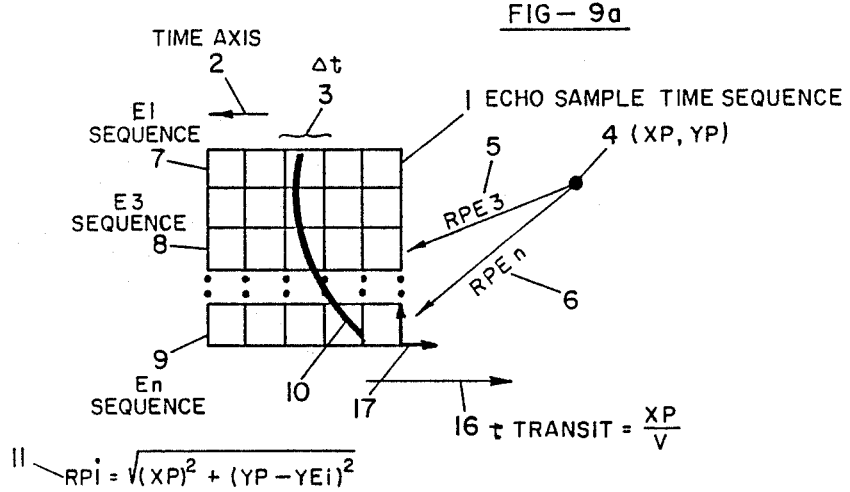
$RP_i = \sqrt{(XP)^2 + (YP - YE_i)^2}$
$t \text{ RETURN TO ELEMENT } i = \frac{RP_i}{V}$
$t \text{ TOTAL} = \frac{XP + RP_i}{V}$
SAMPLE # ≡ SN = $\frac{t \text{ TOTAL}}{\Delta t}$ ; $\Delta t$ ≡ SAMPLE PERIOD
$XP + \sqrt{(XP)^2 + (YP - YE)^2} = SN \cdot \Delta t \cdot V$
*FIG—9b*
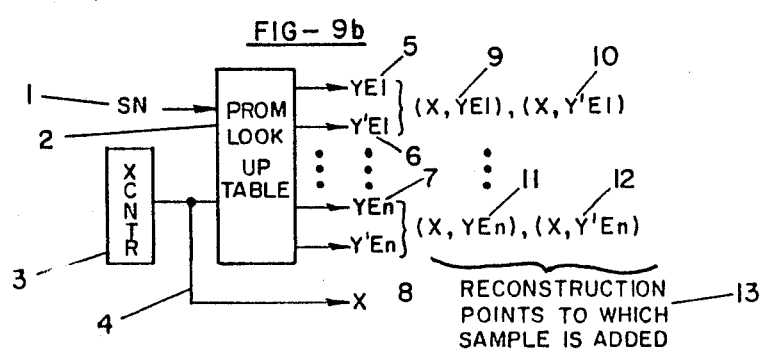
*FIG—9c*
SIMULTANEOUS BEAMFORMING WITHOUT ECHO
BUFFER MEMORIES

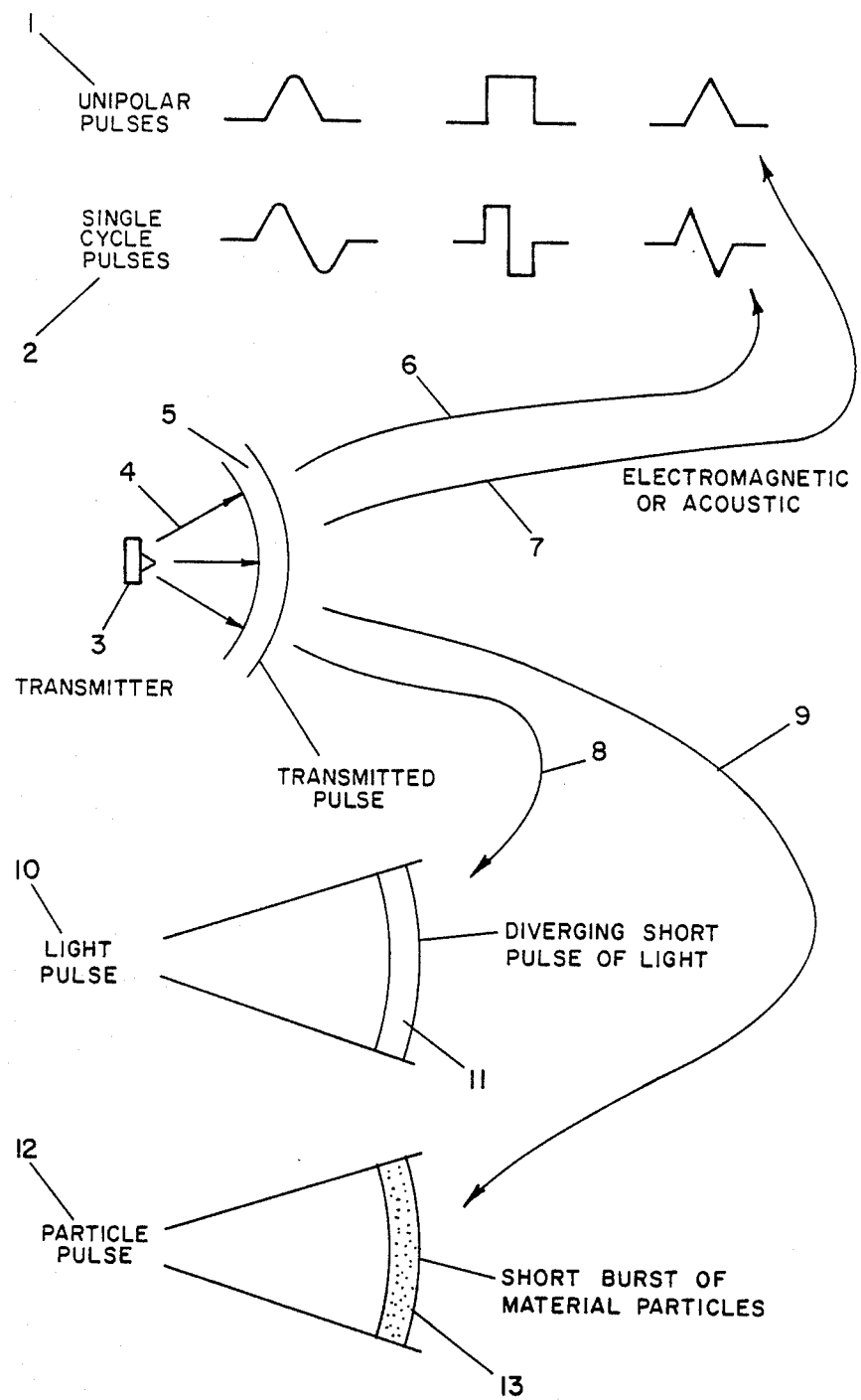
FIG—10
NON-INTERFERING OR INTERFERENCE FREE

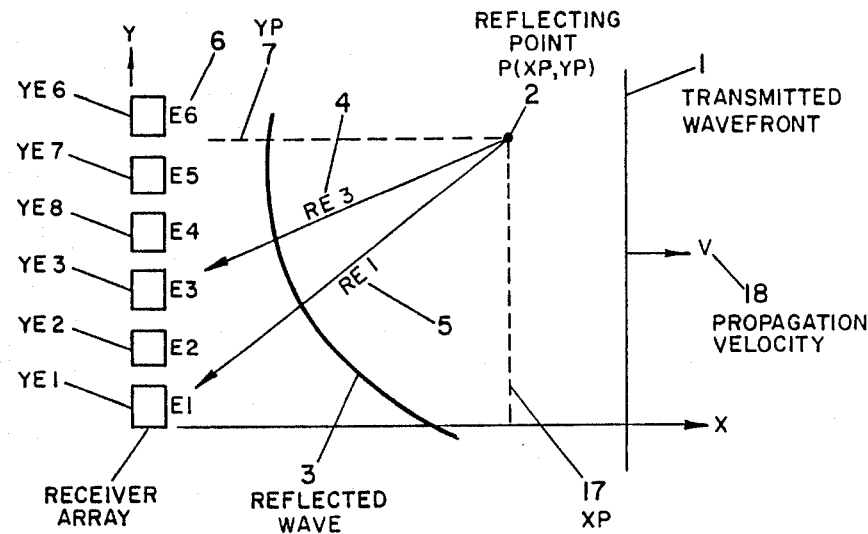
8 —— TRANSMIT TIME OF FLIGHT $= \frac{XP}{V} \equiv XT(XP)$
9 —— REFLECTION TIME OF FLIGHT FOR ELEMENT i $= \frac{\sqrt{XP^2 + (YP - Yi)^2}}{V} \equiv RT(XP, YP, Ei)$
10 —— ADDR $(XP, YP, Ei) \equiv$ LOCATION IN ELEMENT i MEMORY $= \frac{XT(XP,YP) + RT(XP,YP,Ei)}{(\Delta t) V}$
11 —— WHERE $\Delta t =$ SAMPLE INTERVAL
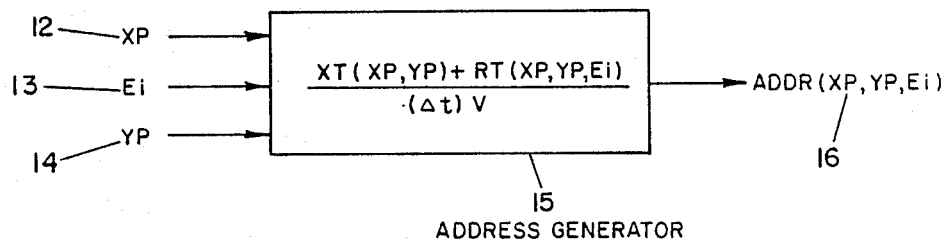
FIG—11
BEAM FORMING ALGORITHM FOR RECEIVED ECHOES WITH SPHERICAL CURVATURE.

MULTIPLE TRANSMITTERS AND TRANSMISSIONS

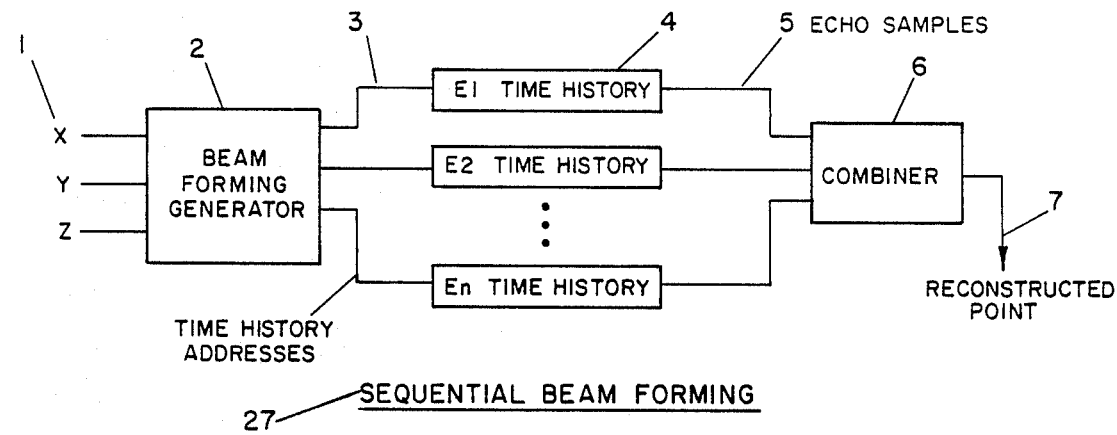
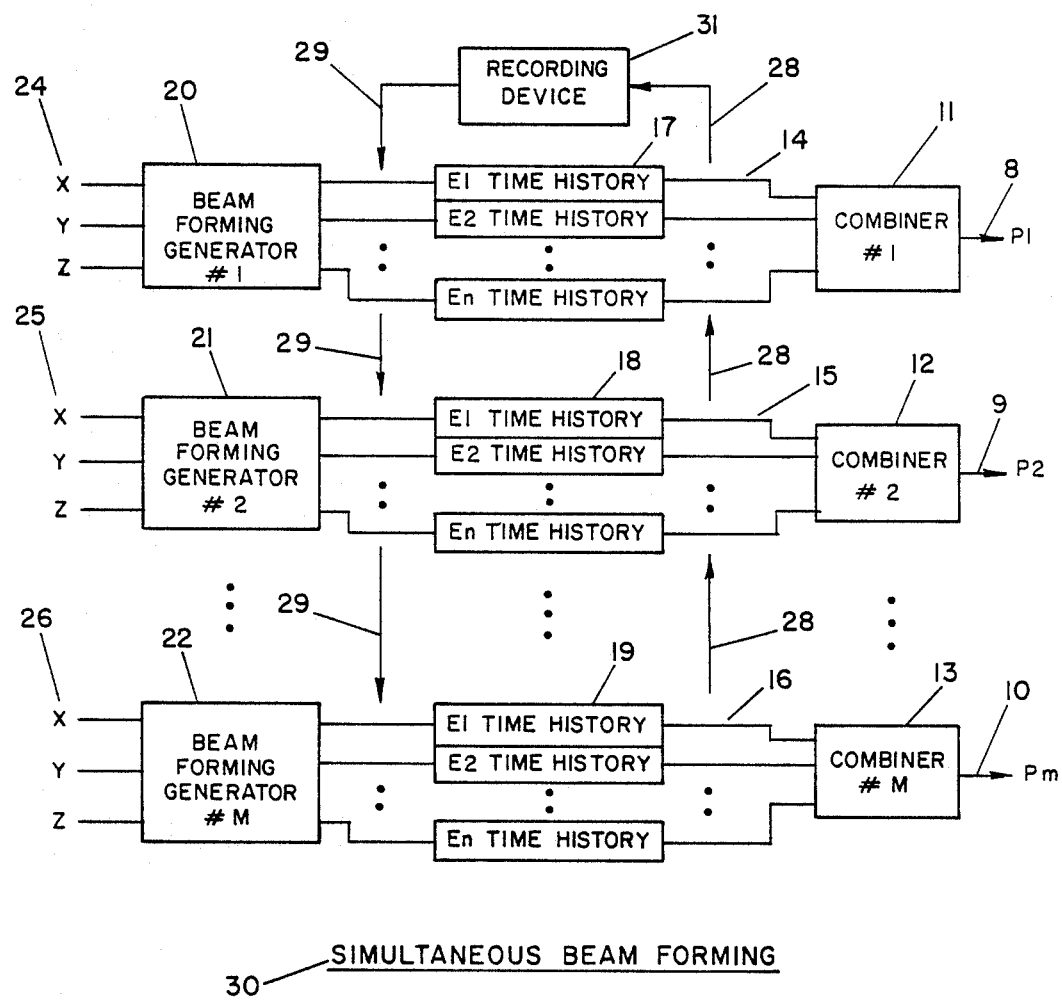
FIG-13
SIMULTANEOUS AND SEQUENTIAL
BEAM FORMING

DEVICE FOR IMAGING THREE DIMENSIONS USING SIMULTANEOUS MULTIPLE BEAM FORMATION

CROSS-REFERENCES TO RELATED APPLICATIONS

This is a continuation-in-part of application Ser. No. 799,424, filed Nov. 19, 1985, now U.S. Pat. No. 4,688,430.

BACKGROUND OF THE INVENTION

1. Field of the Invention

This invention relates to the three dimensional imaging of objects using radiated pulses of energy.

2. Description of the Prior Art

Heretofore imaging of three dimensional volumes was accomplished using multiple sequentially transmitted pulses. Each transmission and its associated echoes yields information on only a small portion of the volume. Thus it would take a relatively long time to image a three dimensional volume of significant spatial extent.

U.S. Pat. No. 4,332,016 describes an ultrasonic device for three dimensional imaging of objects using a narrow beam of insonification formed by a transmitted pulse. The objects to be imaged are mechanically moved past the beam and insonified repeatedly with transmitted pulses thus taking a relatively long time to form a complete image and in addition requiring a plurality of transmitting transducers.

U.S. Pat. No. 3,918,025 describes an ultrasonic device for three dimensional imaging using a frequency swept pulse of ultrasonic energy. However because of a frequency swept transmission the echoes from the object field will exhibit many interference effects that will vary as a function of their angular position. By means of the frequency sweep this device essentially electronically scans a continuous fan shaped beam over a field of objects and thus does not insonify the object field simultaneously with a single transmitted pulse and thus requires a longer time to obtain a three dimensional image.

U.S. Pat. Re. No. 30,397 describes an ultrasonic device for three dimensional imaging using a two dimensional real time scanner physically scanned in directions orthogonal to its tomographic plane and thus require a relatively long time to obtain a three dimensional image.

U.S. Pat. No. 4,131,022 describes an ultrasonic device for three dimensional imaging. However this device uses a scanned beam of ultrasonic energy and requires a longer time to completely image a volume.

SUMMARY

This invention, by transmitting particularly shaped pulses, can reconstruct an image using a very sparse receiver array without grating lobes. By also having the pulses propagate through a wide solid angle, echo information from a three dimensional volume can be received and stored or processed into an image after the transmission of a single pulse. The echo information can be processed by a parallel processor in real time to reconstruct an image of the three dimensional volume. This makes it possible to image three dimensions in real time using very sparse receiver arrays.

Therefore it is an object of this invention to provide three dimensional imaging with a single pulse of energy and to be able to use a sparse array of receiver elements to receive echoes unambiguously from a three dimensional field of objects.

Another object is to image a three dimensional volume in real time and to avoid grating lobes and other interference effects when using a sparse array of receiver elements.

BRIEF DESCRIPTION OF THE DRAWING

FIG. 2 shows the form of the echo data recorded in a simplified echo buffer memory when the echoes are caused by a single point reflector.

FIG. 3 shows the forms of the echoes recorded in a portion of a more complex echo buffer memory when the echoes are caused by two point reflectors.

FIG. 6 illustrates the conversion of multicycle pulses to unipolar pulses.

FIG. 8 shows one of the various possible receiver array configurations.

FIG. 9 shows an alternate reconstruction technique where echo buffer memories memories are not required and each echo sample is processed as soon as it is received.

FIG. 10 shows noninterfering or interference free pulses of various types.

FIG. 11 shows a beamforming algorithm for received echoes with spherical curvature.

FIG. 13 shows simultaneous and sequential beamforming. that has a correction for spherical transmitted pulses.

DESCRIPTION OF THE PREFERRED EMBODIMENT

Figure 1:
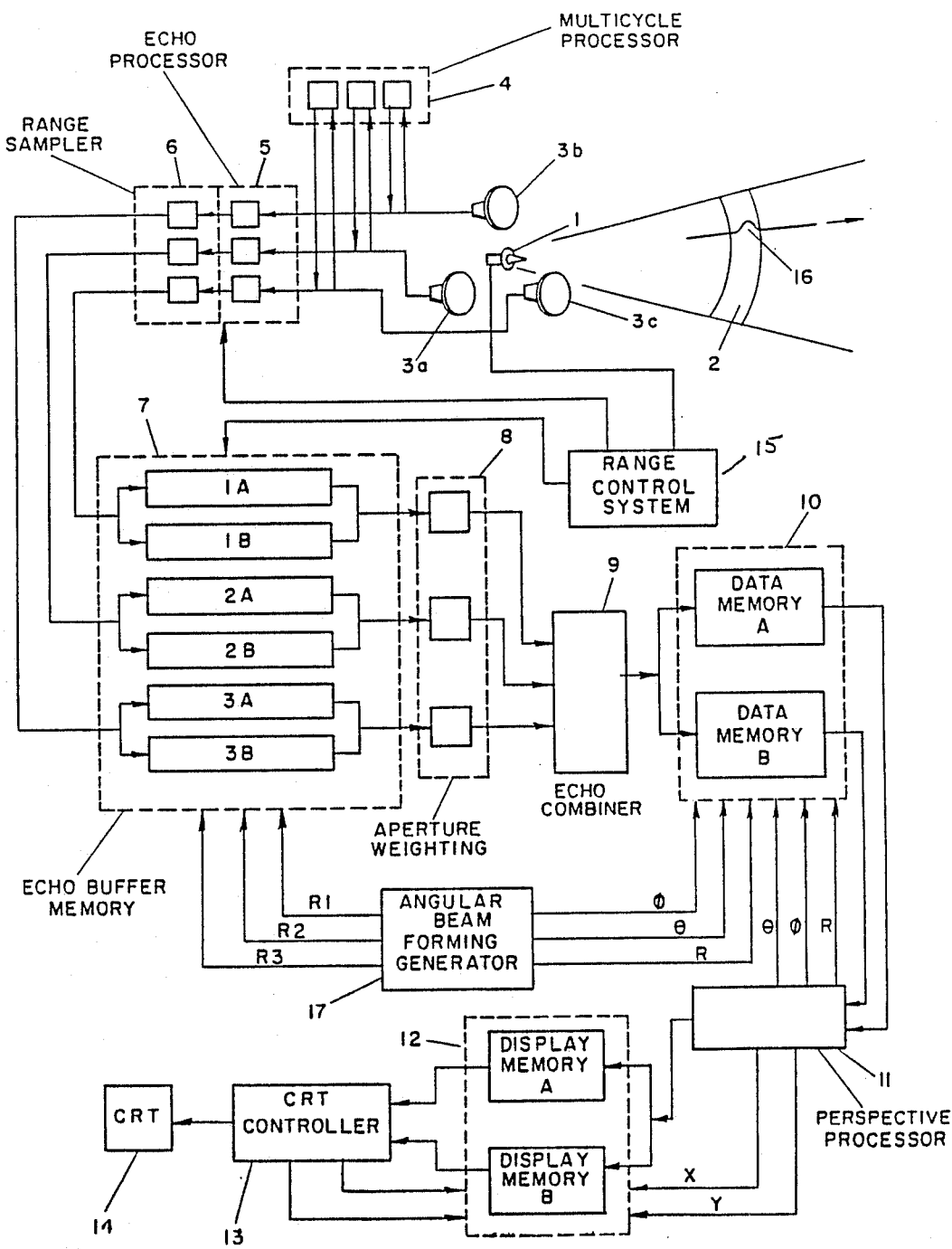
FIG. 1 is a diagram of a simplified version of the invention using only three receiver elements.

The apparatus described herein is a means of imaging three dimensions with the transmissions of a single acoustic pulse of energy. In this manner the image can be formed and updated much faster than images with multiple acoustic transmissions. If imaging time constraints permit, multiple transmissions could be used to improve the signal to noise ratio and reduce the sidelobe level thereby increasing the dynamic range.

This means of imaging uses a single cycle (FIG. 5—4,5,6), unipolar (FIG. 5—1,2,3) or wide angle multicycle (FIG. 5—7) pulse to insonify a wide two dimensional solid angle (FIG. 5—8 through 14) uniformly.

A unipolar pulse is a noninterfering or interference free pulse since there are no negative portions of the pulse which will add destructively to the positive portions of the pulse (FIG. 10 . . . ). In addition, delayed or phase shifted replicas of the pulse cannot add together constructively since there is only one positive portion (FIG. 10 . . . ). Therefore the radiation pattern will not be modified by interference effects and the radiation pattern will be uniform.

A single cycle pulse has a positive and negative portion (FIG. 10 . . . ) and for one delay value corresponding to the length of the pulse negative interference can occur, however, as with the unipolar pulse, constructive interference cannot occur. Therefore this is a noninterfering or interference free pulse with respect to constructive interference.

A multicycle pulse transmitted from a very small transducer will have a very wide main lobe (FIG. . . . 5—14) and within the solid angle included in the main lobe could be considered a noninterfering or interference free pulse. However when reflected from objects interference patterns will occur. These patterns may be manifested as specular reflections.

Unipolar pulses may also be constructed with other forms of energy such as pulses of particles and electromagnetic pulses including light.

In general, pulses that do not exhibit deleterious interference effects within a particular imaging system could be considered noninterfering or interference free for the purposes of the particular imaging system.

A planar or three dimensional array of receiver elements (FIG. 8) is used to detect echoes caused by the single acoustic transmission. A receiver array with sparsely spaced elements (FIG. 8) may be used if the acoustic transmission is a single or unipolar pulse since no grating lobes will occur. Sparsely spaced elements may also be used with a multicycle pulse by detecting and filtering the echoes at the receiver elements outputs before further processing occurs (FIG. 6). The receiver elements may double as transmitters or separate transmitting elements may be used.

The two dimensional direction of a given point reflector may be determined by measuring the differences in times that the echo reaches each of the elements of the receive array. This provides the basis for the formation of a beam or reception in a particular angular direction. The point reflectors distance from the receiver is determined by the echoes time of flight and therefore its location in the echo buffer memory and also its location in a formed and sampled beam of reception.

The problem of specular reflection is relieved by using the unipolar pulse. A surface inclined to the direction of propagation of the acoustic pulse will generate a reflection pattern similar to the angular radiation patterns shown in FIG. 5. It can be seen that acoustic energy is reflected in various directions more uniformly than with a multicycle pulse.

Although several beamforming means could be used to determine the angular direction of the echoes, this embodiment uses the delay and sum technique which can be used for both angular direction determination and focusing (FIGS. 3a, 3b, 3c, 4). As an alternative to summing the echoes may be multiplicatively combined or a combination of additive and multiplicative combination may be used. Various types of dynamic range compression can be used before additive combination which would provide the equivalent of a combination of additive and multiplicative processing.

FIG. 3a shows echo data in the echo buffer memories. The echo data from two reflecting points are shown. One point lies along the angle theta A (FIG. 3a—2) and the other is along theta B (FIG. 3a—1). Waterfront curvature is evident due to the reflecting points being relatively close to the receiver array. To achieve focusing for these points the angular beam forming generator would, when selecting data from the time history memories to be combined, in addition to taking into account the angles theta A and B also allow for the curvature of the data in the echo buffer memory locations (FIG. 11).

This is a simultaneous beam forming technique since the same echo data can be used to form beams in any given angular direction. Additional transmitted pulses are not required since the single transmitted pulse insonifies the whole of the object field which is to be imaged. The echo data from the single pulse contans information on every point within the object field. The simultaneous beams may be formed in a parallel process (simultaneously) or they may be formed in a sequential process using the same echo data.

An echo buffer memory for each receiver element is not required if the beam forming generator immediately sums each received echo sample into all of the reconstruction points in data memory (FIG. 1) which are appropriate (FIG. 9). By referring to FIG. 3a it can be seen that if the two reflecting points were located closer together, the two separate curved sets of echoes would intersect. The echo sample at the point of intersection would be used in the reconstruction of both reflecting points. When many points are to be reconstructed each echo sample is used to reconstruct numerous points.

Figure 4:
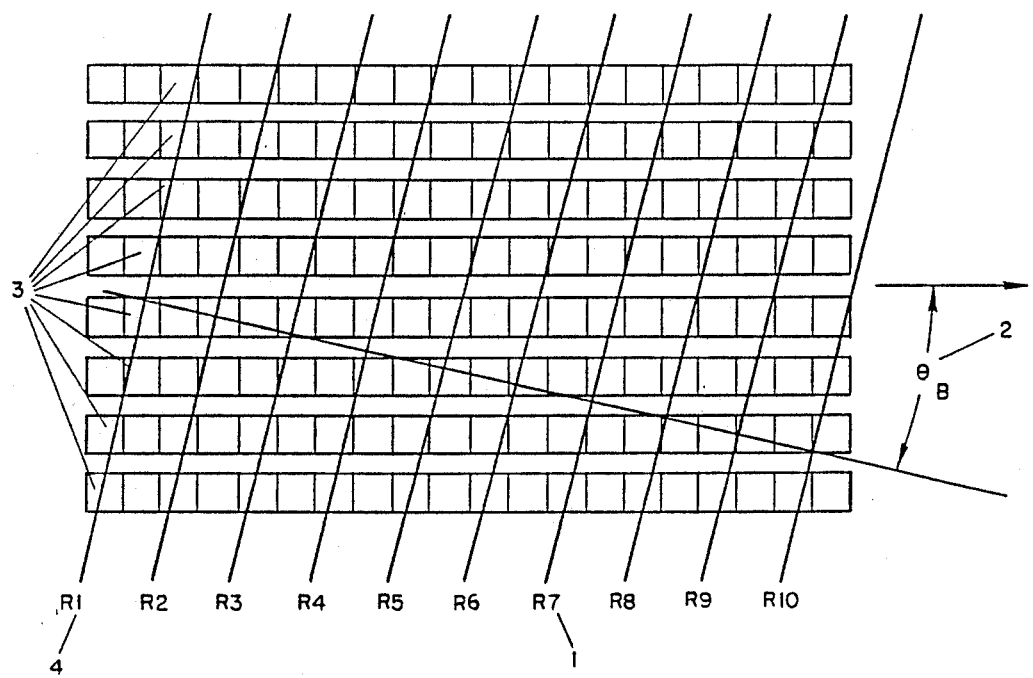
FIG. 4 illustrates the manner in which receiver beam forming takes place in the echo buffer memory.
Figure 5:
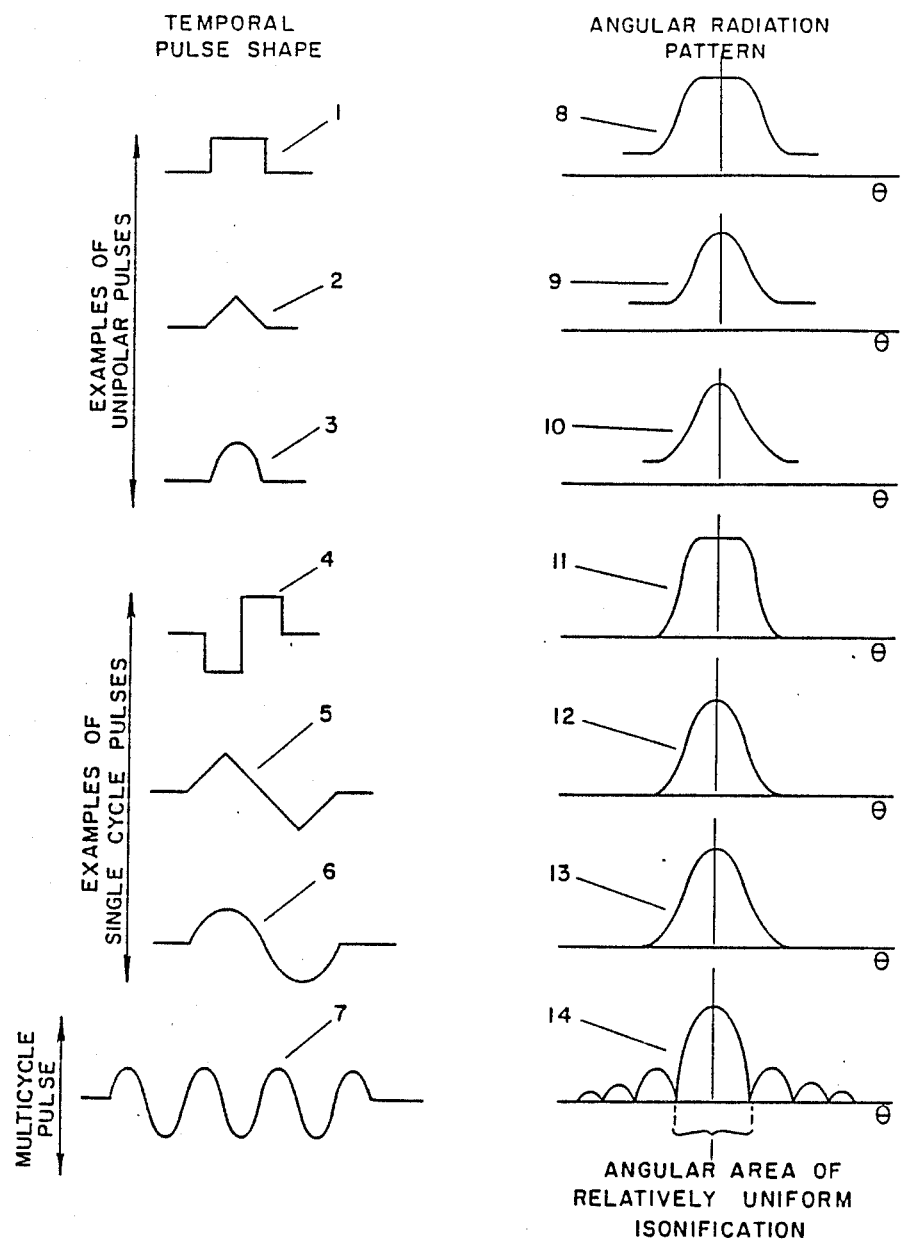
FIG. 5 illustrates the various types of pulses that may be used by the transmitter and the beam patterns of each pulse.
Figure 7:
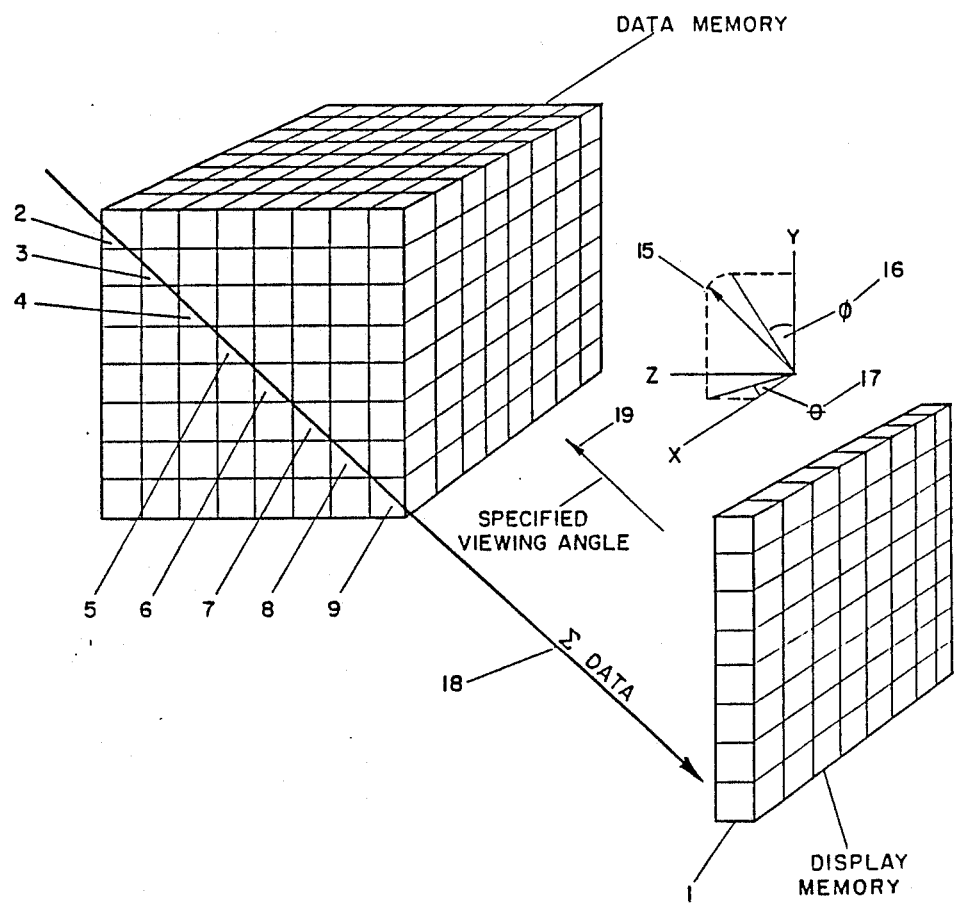
FIG. 7 shows a simplified data memory and display memory to illustrate the processing required for perspective viewing of three dimensional data on a two dimensional display.

FIG. 9 shows simultaneous beamforming without echo buffer memories. Each echo as it is received is summed into the appropriate locations (representing reconstruction points) in the data memory (FIG. 9a—14). These points and the corresponding data memory addresses are determined by the beamforming generator (FIG. 9a—13) (FIG. 9c). Thus the data memory acts as an accumulator as the points are being reconstructed. A data memory is not necessarily required as the echo samples could be summed into the appropriate locations in the display memory (FIG. 9a—14) (FIG. 1—12) directly. The curly brackets show the required changes. This would require the beamforming generator to act in cooperation with the perspective processor (FIG. 9a—16) (FIG. 1—11) in determining the appropriate display memory locations into which each echo sample would be summed. (The echoes may be combined in ways other than addition.) Echoes from the receiver elements (FIG. 9a—1) are processed and sampled (FIG. 9a—3) by the echo processor (FIG. 9a—2) and stored in latches (FIG. 9a—4). The multiplexer (FIG. 9a—5) selects an echo as commanded by the beamformer (FIG. 9a—13) which is one input (FIG. 9a—6) to an adder (FIG. 9a—7). The other adder input (FIG. 9a—9) is from a data or display memory data location as selected by the beamformer (FIG. 9a—13) which will act in cooperation with the perspective processor (FIG. 9a—16) if the image is being created directly in the display memory. This will be a read modify write memory operation. After the last echo sample is processed in the data or display memory will contain the reconstructed image (FIG. 9a—15). If the image is being formed directly in the display memory, the perspective processor will send the stream of desired reconstruction point coordinates (FIG. 9a—17) directly to the beamforming generator rather than using them to access data in the data memory (FIG. 1—10). This will cause the beamformer to sum echo samples directly into the display memory pixel addresses which will form the final displayed image. Thus the point reconstruction and the collapsing of the three dimensional data into a two dimensional image will occur simultaneously as a result of the action of the beamforming generator. The tomographic image will also be extracted in this process and written into the display memory.

A beamforming algorithm is illustrated in FIG. 9b. The array of squares represents the echo sample time sequence (FIG. 9b—1). FIG. 9b—4 is a reflecting point which also represents the reconstruction point in data memory. FIG. 9b—17 are the geometrical reference coordinates. A two dimensional example is shown to simplify the explanation. The technique can be extended to three dimensions in a straight forward manner. The geometrical line where x equals zero is the location of a linear array of receiver elements, E1 through En. FIG. 9b—7,8,9 show the echo time sequences for three receiver elements.

FIG. 9b—10 shows an echo recorded in the time sequences for a reflecting point at location xp,yp,zp), (FIG. 9b—4). FIG. 9b—16 shows the distance vector and time of flight for the transmitted pulse which originated at location (0,0). FIG. 9b—3 show the time period with which the echoes are sampled. FIG. 9b—11,12,13,14,15 are the equations relating the reconstruction point position to the receiver element location and the echo sample number in the time sequence of echo samples. The equation in FIG. 9b—15 can be used, with a transmitted plane wave pulse (FIG. 11—1) parallel to the y axis a PROM look up table (FIG. 9c—2) which takes the sample number (FIG. 9c—1) and the reconstruction point's x coordinate (FIG. 9c—4) as address inputs and gives as an output y coordinates for each receiver elements echo sample time sequence (FIG. 9c—5,6,7,8). When these y coordinates are paired with the x coordinate, all of the reconstruction points' coordinates (FIG. 9c—9,10,11,12,13) are generated into which the echo samples should be summed. FIG. 9—c,9,10 represent the image coordinates of the pixel or voxel that echo sample number SN (FIG. 9—a,1), from receiver element E1 (FIG. 9—a,1), that should be summed into, or combined with. It can be seen that a given echo sample, (FIG. 9—c,1), is summed into many different reconstructed pixels (FIG. 9—c,11,12). Although only two pixel coordinates are shown, (x, yEn) and (x,y'En), there may be many more. In general, given a particular beam forming or reconstruction algorithm, an equation can be derived that can be used to program the PROM look up table. The process is not reconstruction algorithm or beamforming algorithm dependent.

Various algorithms can be used to form the simultaneous beams which in general can be called beamforming or beamforming algorithms. FIG. 4 shows a geometry that assumes the echo wavefronts are planar, this is the Fraunhofer approximation. FIGS. 3, 9 and 11 show a spherical wavefront geometry.

Any of these algorithms may be used in the angular beam formaing generator to form sequential or simultaneous beams of reception. In sequential beamforming the echo data is used once to form a beam of reception in one angular direction it is then used again to form a beam of reception in a different angular direction, and then again each time for beams in each remaining angular direction (FIG. 13—27).

In simultaneous beamforming each echo sample is simultaneously used in forming all desired beams of reception (FIG. 13) which can be done by replicating the echo buffer memories.

FIG. 13 shows both a sequential beamformer (FIG. 13—27) and a simultaneous beamformer (FIG. 13—20). In this implementation the simultaneous beamformer has replicated the echo buffer memories n times (FIG. 13—17,18,19) so that m points (FIG. 13—24,25,26) may be reconstructed in parallel. FIG. 9 also shows a simultaneous technique which uses no echo buffer memories and is discussed elsewhere. FIG. 13—27 shows the sequential technique where a single stream of point coordinates (FIG. 13—1) to be reconstructed are fed to a beamforming generator (FIG. 13—2) which uses one of many possible beamforming algorithms to generate echo buffer memory addresses (FIG. 13—3) for the echo buffer memories (FIG. 13—4). There are n echo buffer memories where n is the number of receiver elements. The addressed echo buffer memories send n echo samples (FIG. 13—5) to the echo combiner (FIG. 13—6) which combines the samples to form the reconstructed point (FIG. 13—7).

FIG. 13—30 shows a simultaneous beamformer which replicates the circuitry of the sequential beamformer m times (FIG. 13—20,21,22) to allow the simultaneous reconstruction of m points FIGS. 8, 9, 10). This requires a replication of the echo buffer memories (FIG. 13—11,12,13) and the combiners (FIG. 13—8,9,10). This allows m beams at different angles to be reconstructed simultaneously.

A recording device may be added to the imaging machine so that sampled echo data may be recorded from the echo buffer memories and later replayed through the imaging machine for reconstruction of the image. FIG. 13—31,28,29 shows where the recording device should be connected. In general in should be connected so that it can read and write data out of and into the echo buffer memories.

A set of echo samples can be frozen in the echo buffer memories by not updating them with new echo data. This causes the repeatedly reconstructed image to be frozen. However the three dimensional data can still be viewed from different user selected perspectives and tomograms can be selected from different positions and orientations. This in conjunction with the recording device allows previously recorded echo data to be replayed though the machine and the resulting image manipulated as desired by the user.

If the echoes dynamic range was not compressed before combination then it should be compressed after combination to reduce the size of the memory elements required in the machine and to match the dynamic range of the display.

Once the echoes have been sampled and segregated as to range by measuring the time of flight and combined to resolve the various angular directions and ranges many different means could be used to present them on the output display. The preferred embodiment uses two separate memories, the data memory (FIG. 1—10) and the display memory (FIG. 1—12). This allows maximum flexibility in viewing the processed echo data.

The individual memory elements in the data memory correspond to each of the individual ranges and angular directions of the sampled and combined echoes. The data memory then represents the three dimensional solid angular volume originally insonified by the transmitted pulse. The display memories memory elements correspond to the pixels that will be displayed on a two dimensional display, in this embodiment, a cathode ray tube (CRT).

The perspective processor (FIG. 1—11) is responsible for processing the echo data contained in the data memory into the form that will be displayed on the CRT. The perspective processor can select a two dimensional plane from any location and orientation in data memory and place it in the display memory for presentation on the CRT (FIG. 1—14). This gives a tomographic image with user selectable tomogram orientation and position.

The perspective processor can also display three dimensional data on the two dimensional CRT as a view through a translucent volume (FIG. 7) when the objects in the viewing volume are not opaque with respect to the insonification. The perspective processor creates volumetric views by first defining the volume of data in data memory which has been selected by the user. This may include the complete volume of three dimensional data represented by data memory. It then collapses the data in the direction of the viewing perspective (FIG. 7) specified by the user. The collapsing of the data is done in the following manner. The perspective processor assigns multiplicative weighting to the data in the direction of the specified perspective (FIG. 7). It does this in such a way that the data in the back, with respect to the selected perspective, of the volume which is the background is weighted with a smaller number than the data in the foreground. It then sums up the weighted data (FIG. 7—2 through 9) that will underlay a given pixel on the CRT (FIG. 7—1) and places it in the proper location in the display memory. This is repeated for each pixel location in display memory.

Thus the volumetric data in data memory is weighted and mathematically integrated in the perspective direction selected by the user and then displayed on the CRT.

DETAILED DESCRIPTION

FIG. 1 shows a simplified version of the preferred embodiment to facilitate understanding of the structure of the machine. Only three elements are used in the receiver array (FIG. 1—2). The number and placement of the receiver elements has an effect on the equivalent receiver sidelobe level and its sensitivity.

The transmitter element (FIG. 1—1) consists of a low Q, wideband piezoelectric material which will closely reproduce the electrical signal applied to it converting the electrical waveform or a predictable function of the waveform to a similar acoustic waveform. The range control system (FIG. 1—15) applies a unipolar electrical signal or other appropriate electrical function to the transmitter element which causes a unipolar acoustic pulse (FIG. 1—16) to propagate down the solid angle determined by the transmitters angular radiation pattern. As the propagating pulse encounters objects in its path echoes are generated which propagate back toward the receiver elements (FIG. 1—3a,3b,3c) (FIG. 8—8a,8b,8c,8d,8e). FIG. 8 shows some of the possible receiver array configurations. FIG. 8—e is a circular array which achieves maximum resolution for a given number of elements.

A range clock oscillator is enabled at the time of transmission. Each range clock generator pulse increments a range address counter, the binary state of which indicates the range of the objects responsible for the echoes currently being detected at the receiver elements. This binary state provides the memory addresses for the echo buffer memory (FIG. 1—7). Each of the receiver elements outputs are filtered, amplified as a function of time of flight to compensate for attenuation, and compressed in dynamic range by the echo processor (FIG. 1—5).

If a multicycle pulse is used the echoes are detected and then filtered. The outputs are then digitized by an A/D converter upon each range clock oscillator pulse and written into echo buffer memory at the address specified by the range address counter.

This process continues until echoes have been received and stored out to the maximum range of interest. At this ime the buffer memory will contain a time history for each receiver element of the echoes generated by the transmitted pulse. This represents a sampled replica of the three dimensional wavefield generated by the echoes of the insonified objects being imaged.

The echo buffer memory consists of two alternating memories, memory A and memory B (FIG. 1—7). While one memory is receiving current echo data the other memory is transferring the previous echo data to the echo combiner (FIG. 1—9). The echo buffer memory size depends on the number of range samples desired, the compressed dynamic range of the echo samples and the number of receiver elements in the receiver array. Only three elements are shown in FIG. 1. Aperture weighting (FIG. 1—8) multiplies each of the elements echoes by a number which represents a portion of an aperture weighting function used to further modify the receiver radiation pattern. This is unimportant if only three elements are used but could be used to advantage with a larger array.

The echoes are transferred from the echo buffer memory (FIG. 1—7) by the angular beam forming generator (FIG. 1—17) which selects the appropriate echoes to combine, via a particular beamforming algorithm, for each range increment and angular direction (FIG. 2, FIG. 3a, FIG. 4). FIG. 3a shows a linear array of elements that comprise a portion of a two dimensional planar receiver array used here to better illustrate the process of angular beam formation. The beam forming process is performed for all elements in the array, and the data in their echo buffer memories, in the same way as it is performed for the linear array portion which is used as a simplified example. Next to the elements (FIG. 3a) are shown the corresponding echo buffer memories.

FIG. 3b shows the planar array from which the linear array of elements was extracted. FIG. 3c shows an edge view of the array with two point reflectors positioned in front of it. Shown in the echo buffer memory (FIG. 3a) is the data pattern caused by the objects a and b after a single pulse transmission and reception. The effects of varying range and wavefront curvature are evident in echo patterns A and B. The effects of the different angular directions of the point reflectors are also evident in the patterns.

The beam forming generator (FIG. 1—7) forms the image of the point reflectors residing along a positional vector in the angular direction theta B (FIG. 3a—2) as follows. Refer to FIG. 4. Wavefront curvature is neglected to facilitate understanding of the beamforming process. R1 through R14 (FIG. 4—1) are the range increments in the theta B direction (FIG. 4—2). For a point reflector at range R1 (FIG. 4—4), given the angular direction, the angular beam forming generator (FIG. 1—17) determines the memory locations (FIG. 4—3) in the echo buffer memory where the echo data should reside. It then extracts the data and combines it in the echo combiner (FIG. 1—9). It places the results in the appropriate location in the three dimensional data memory (FIG. 1—10). It repeats this process for all range increments lying along the vector in the theta B direction (FIG. 4—2). When it has finished it has formed a beam of reception in the theta B direction. This is repeated for each angular direction to be resolved in the insonified solid angular volume. For a planar array of receivers (FIG. 3b), the echo data locations required to reconstruct a point would be located along a plane rather than the line (FIG. 4—3) and the echo buffer memories would form a three dimensional array rather than a two dimensional array (FIG. 3a). The intersection of the plane with the three dimensional echo buffer memory sample or data locations would determine the echo buffer data to be combined to reconstruct the point reflector. The location and orientation of the plane is determined by the point reflector's distance and angular orientation with respect to the receiver array. Theta B (FIG. 4—2) represents a two dimensional version of the planes orientation and R7 (FIG. 4—1) represents a two dimensional version of location.

FIG. 11 shows a different beamforming algorithm that can be used which takes into account the wavefront curvature of the received echoes. This is illustrated again by a linear array of receiver elements which could be extracted from a planar array (FIG. 3b). This is done to facilitate understanding. The technique is to be extended to planar or three dimensional arrays in a way similar to the previously described beamforming process. An array of receiver elements E1 through E6 (FIG. 11—6) receives an echo (FIG. 11—3) caused by the reflecting point P(xp,yp) (FIG. 11—2) and records the time sequence in echo buffer memories associated with each receiver element. The point was insonified by a transmitted plane (FIG. 11—1) wavefront (FIG. 11—1). The Y coordinates for the receiver elements and the reflecting point are shown in FIG. 11—7. The x coordinate of the reflecting point is shown in FIG. 11—17. FIG. 11—8 is an equation of the time of flight from the transmitter to the reflecting point which is the X distance from the transmittee to the reflecting point divided by the propagation velocity (FIG. 11—18). FIG. 11—9 is an equation for the time of flight of the echo from the reflecting point to the receiver elements where Yi represents a selected receiver element. FIG. 11—10 is the equation for the location in the echo buffer memory where the echo from the reflecting point will reside. This location can be found by dividing the sum of the distances by the the interval at which echo samples were taken (FIG. 11—11). This forms an address for the echo buffer memories. FIG. 11—15 is a portion of the angular beam forming generator for this beam forming algorithm. The coordinates of the desired reconstruction point Xp, Yp (FIG. 11—12,14) are inputs along with the element number (or time history memory number) Ei (FIG. 11—13) where i represents the specific element number. A ROM lookup table, which is programmed with the results of the equation (FIG. 11—15), may be used to derive ADDR(Xp, Yp, Ei) FIG. 11—16 which is the desired echo buffer memory address. There will be one address generator (FIG. 11—15) for each receiver element. These in combination will select the echoes to be combined to reconstruct an image of the reflecting point.

In this manner the sampled wavefield replica contained in echo buffer memory is processed to form an image of the original object field. The result is a three dimensional image of the insonified objects which is contained in data memory (FIG. 1—10).

Each echo sample in echo buffer memory is then used a multitude of times. The number of times will be proportional to the number of angular directions to be resolved. The data memory (FIG. 1—10) is composed of two alternating random access memories whose size depends on the dynamic range of the processed echoes, the number of angular directions to be resolved and the number of range samples required. While data is being written into one memory it is being read out of the other by the perspective processor (FIG. 1—11). Since data in data memory represents a three dimensional image of the insonified volume the perspective processor extracts data from the data memory and processes it into a form suitable for two dimensional display on a CRT.

Tomograms at various ranges and orientations may be displayed. When this is done the perspective processor computes the addresses of the required data making up the pixels of the tomogram utilizing the user selected range and orientation information. It extracts the appropriate point from the stream of reconstructed point and transfers them to the tomogram pixel locations in display memory. Three dimensional data may also be displayed on the CRT. The user will select the boundaries of the volume and the orientation from which he wished to view the volume. The perspective processor will then collapse the three dimensional data contained in the data memory, within the user selected boundaries, in the direction of the user selected orientation (FIG. 7—19).

For each pixel location in display memory (FIG. 7—1) the perspective processor will determine the sequence of addresses in data memory (FIG. 7—2 through 11) that contain three dimensional data which will be weighted and summed to form the pixel values. It will then proceed with the weighted summation and place the results in the appropriate location in the display memory (FIG. 7—13). The perspective processor determines the viewing vector (FIG. 7—15) from the perspective orientation requested by the user. It uses the angles phi (FIG. 7—16) and theta (FIG. 7—17) to compute an address vector (FIG. 7—18 through the data memory (FIG. 7—14) for each particular pixel location (FIG. 7—1) in display memory (FIG. 7—13). It then applies a multiplicative weighting to each of the data contained in the addresses (FIG. 7—2 through 11) intersected by the address vector. This weighting enhances the foreground data (FIG. 7—7 through 11) more than the background data (FIG. 7—2 through 6) thus giving a range perspective in the CRT display. It then sums the data long the viewing vector thus performing an inegration and places the results in the appropriate pixel location (FIG. 7—1) in display memory until a complete two dimensional image of the three dimensional data is formed.

The display memory (FIG. 1—12) is composed of two alternating random access memories. While one is being updated by the perspective processor the other is being used by the CRT controller (FIG. 1—13) to form the video signals required by the CRT. The CRT controller generates the horizontal and vertical sync pulses and combines these with the data extracted from display memory to create the CRT input signal.

Multiple Transmissions

More than one transmitter and more than one transmission can be used to form a single complete image. This redundant transmission can increase the signal to noise level and reduce the sidelobe level of the reconstructed image.

When more than one transmission is used with a single transmitter to generate redundant transmissions, the resulting echoes are summed in the echo buffer memories of the receiver elements. This results in an increase in signal to noise level.

When more than one transmitter is used to generate the redundnant transmissions, the echoes from each single tramsission are combined independently to form a reconstructed image and summed into the existing image in data memory. This results in a decrease of the sidelobe level and an increase in the signal to noise ratio.

Figure 12:
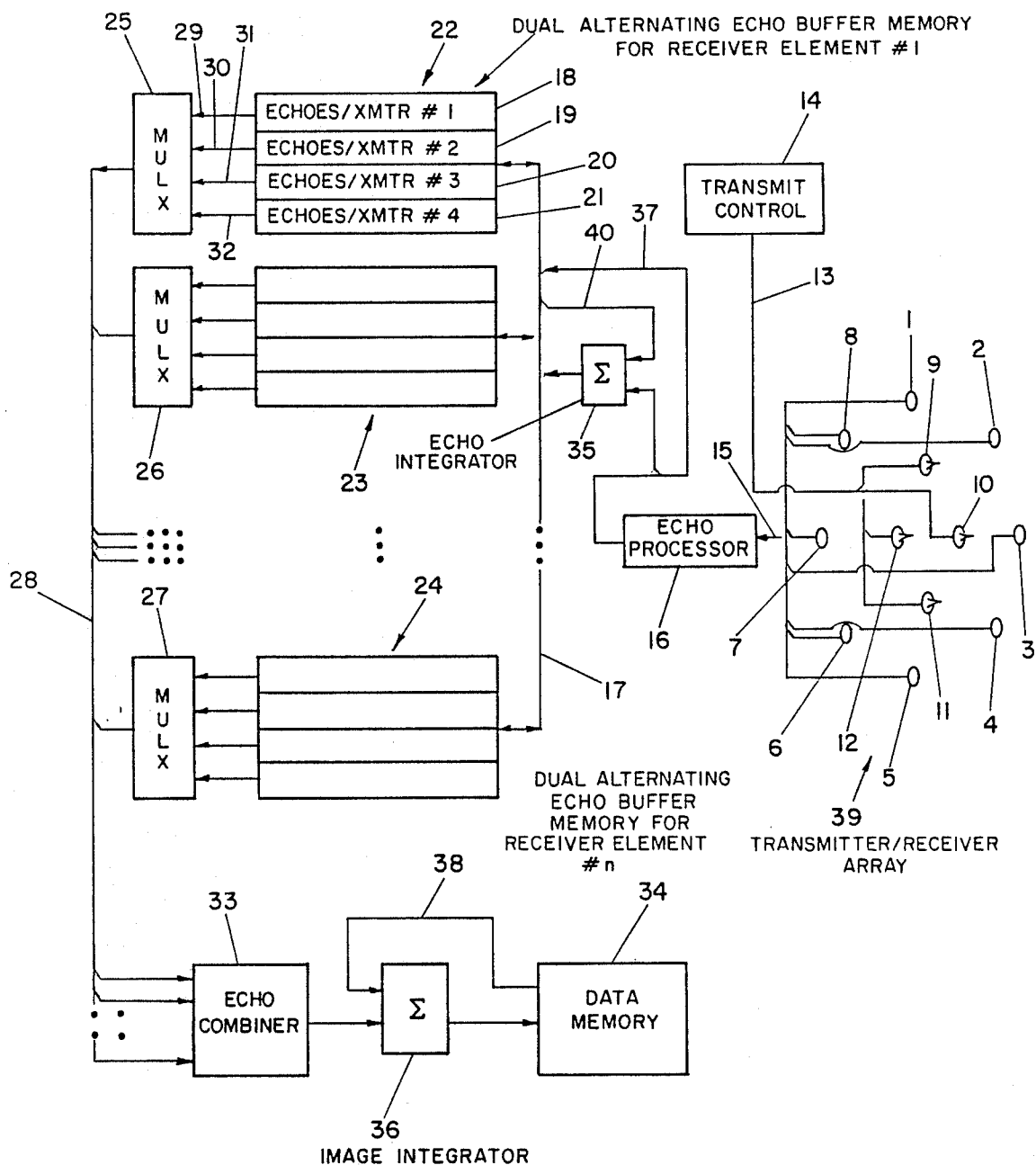
FIG. 12 shows multiple transmissions used to reduce the sidelobe level and increase the signal to noise ratio.

FIG. 12 shows the modifications required to FIG. 1 to accommodate multiple transmissions and multiple transmitters. FIG. 12—1,2,3,4,5,6,7,8 are the elements of the receiver array. FIG. 12—9,10,11,12 are the multiple transmitters which in sequence transmit pulses. Each transmitter may transmit several times before the next transmitter starts its transmissions. The transmit control (FIG. 12—14) delivers shaped electrical pulses (FIG. 12—13) to each transmitter element (FIG. 13—9,10,11,12) in a predetermined manner. After each transmission, echoes (FIG. 12—15) are processed by the echo processor (FIG. 12—16) as previously described. The echoes are summed into the echo buffer memories by the echo integrator (FIG. 12—35) if a single transmitter element is being redundantly pulsed. If a different transmitter element is being pulsed the data in the echo buffer memories (FIG. 12—25,26,27) will be replaced by the new echo data (FIG. 12—37). Each time, previous to a new transmitter element being pulsed, the echo data from the echo buffer memories must be processed to form a image reconstructed from the old transmitter echo data. This data may consist of the integration of echoes caused by multiple transmissions of the same transmitter. The echo buffer memories corresponding to the selected transmitter are selected by the multiplexers (FIG. 12—25,26,27) and the output signals (FIG. 12—28) are fed to the echo combiner (FIG. 12—33). The image formed by this reconstruction is summed with the existing image (FIG. 12—38) in data memory (FIG. 12—34) by the image integrator (FIG. 12—36).

Receiver Elements used as Transmitters

It is not necessary to have separate transmitting elements (FIG. 1—1, FIG. 12—9,10,11,12) and receiving elements (FIG. 1—3a,3b,3c). If the same type of element is used as for transmitters and receivers as is common in ultrasound imaging machines each element (FIG. 12—1,2,3,4,5,6,7,8,9,10,11,12) in the transmit/receive array (FIG. 12—39) may be used as both a transmitter and receiver by modifying and reconnecting the transmit control (FIG. 12—14) and echo processor (FIG. 12—16). The system would then function as a multiple transmitter system as shown in FIG. 12, except that all of the array elements (FIG. 12—1,2,3,4,5,6,7,8,9,10,11,12) would be used as both transmitters and receivers.

Lidar Imaging Embodiment

This embodiment implements the imaging machine using a very short pulse of light as the transmitted pulse of energy. The transmitter (FIG. 1—1) generates a short pulse of high energy light (FIG. 1—16). The light pulse is noninterfering for the purposes of this imaging machine since the sensing resolution never approaches the wavelength of the light. The light pulse is treated as a uniform burst of energy. The transmitting element is a light source such as a laser that is capable of creating a light pulse of a few nanoseconds duration or shorter which will propagate through a wide solid angle without significant interference effects. The resolution of the system is a function of the pulse length. The receiver elements (FIG. 1—3a,3b,3c) are photo receptors such as photovoltaic materials which can be combined with light concentrators. These elements convert light received from reflecting points to an electrical signal which may be recorded in the echo buffer memory (FIG. 1—7). The image reconstruction proceeds as described in the first embodiment with all of the timing signals adjusted for the propagation velocity being the speed of light. CRT digitizers may be used to sample and convert the received signals to digital form with sub nanosecond sampling resolution. The image may be reconstructed in real time with enough parallel reconstruction electronics or the image may be reconstructed off line at a slower rate.

Radar Imaging Embodiment

This embodiment uses short pulses of electromagnetic energy in the radar spectral range. The transmitter (FIG. 1—1) is now a transmitting radar antenna with a wide solid angle of transmission or beam width which transmits a noninterfering electromagnetic pulse now represented by FIG. 1—16. The receiver elements (FIG. 1—3a,3b,3c) are wide angle receiving antennas which convert the reflected echoes to electrical signals. Image reconstruction occurs as described in the first embodiment with timing adjusted for the propagation velocity.

Particle Pulse Imaging Embodiment

This embodiment uses a short burst of material particles such as subatomic particles as the transmitted pulse of energy (FIG. 1—16). The transmitter (FIG. 1—1) is a particle generator capable of short emissions which will radiate through a wide solid angle. The receiver elements (FIG. 1—3a,3b,3c) are particle detectors which sense reflected particles and convert them to electrical signals. This imaging technique relies on the particles being reflected with predictable velocities. The particles should be scattered rather than acutally reflected so that received echo energy is not dependent on the reflecting or scattering objects orientation. Image reconstruction occurs as described in the first embodiment with timing adjusted for the transmit velocity and the reflection velocity.

Underwater Sonar Embodiment

This embodiment uses underwater acoustic pulses as the transmitted energy. The transmitter (FIG. 1—1) is an acoustic projector which transmits a noninterfering pulse (FIG. 1—2) which propagates though a wide solid angle. The receivers (FIG. 1—3a, 3b, 3c) (FIG. 8a, 8b, 8c, 8d, 8e) are sonobouys which form a sparse vertical receiver array. The receiver converts echoes to electrical signals and transmits them to the echo processor (FIG. 1). Image reconstruction occurs as described in the first embodiment.

While the above description contains many specifics, these should not be construed as limitations on the scope of the invention, but rather as an example of embodiments.

What is claimed is:

1. A means for creating an image of three dimensional volume containing objects at different ranges and two dimensional angular directions, said means being capable of creating the image with a single transmitted pulse, comprising:

(a) A means for generating a unipolar, single cycle, or wide angle multicycle pulse of energy which will radiate through the wide angular volume uniformly;

(b) A means for detecting echoes caused by the objects, at the different ranges and the two dimensional angular directions in the path of propagation of said pulse, having a plurality of three or more sparsely spaced receiver elements;

(c) A means for sampling said echoes as a function of time at each of said receiver elements so as to form a time sequence of echo samples from each of the receiver elements;

(d) A means for storing said echo samples from each of said receiver elements in echo buffer memories so as to create a time history of echoes, resulting from the reflecting points, point reflectors, on the objects in the path of said pulse, for each of said receiver elements;

(e) A means for selecting said samples from said echo buffer memories and combining them so as to form an image of the objects residing at the different ranges along each of the angular directions within said wide angular volume, comprising:

(aa) A means for determining the echo buffer memory locations, for each of the receiver elements, where the samples should reside in each echo buffer memory, thus generating a group of selected samples for each of the points on each of the objects at each of the different ranges, given a particular angular direction;

(bb) A means for combining, by addition, multiplication or a combination of addition and multiplication, the samples in each of said groups of selected samples to form an image of said point reflectors at different ranges along a particular angular direction;

(cc) A means for generating a different angular direction along which different point reflectors will reside and forming images of said different reflectors as in (aa) and (bb);

(dd) A means for repeating step (cc) for each of the angular direction in said three dimensional volume so that images of all possible point reflectors in said three dimensional volume have been formed.

2. In a three dimensional imaging system, capable of creating the image with a single transmitted pulse of energy; A means for reconstructing the image of points which form the image of objects within a three dimensional volume containing objects at different positions utilizing a device comprising:

(a) A means for generating an interference free pulse of energy which will propagate through a wide solid angle uniformly;

(b) A means for detecting echoes caused by points on or within the objects, at different positions in the path of propagation of said pulse, said means having a three or more sparsely spaced receiver elements;

(c) A means for sampling said echoes as a function of time at each of said receiver elements so as to form a time sequence of echo samples from each of the receiver elements;

(d) A means for selecting said echoes samples from said time sequence of echo samples and combining them so as to form an image of a point within said three dimensional volume;

(e) A means for repeating (d) sequentially and or simultaneously to cause the reconstruction of all desired image points.

3. A means for reconstructing the image of objects, consisting of reflecting points, within a three dimensional volume containing objects utilizing a device comprising:

(a) A means for generating at least one interference free pulse of energy which will propagate through the three dimensional volume uniformly encountering the reflecting points which cause echoes;

(b) A means for receiving echoes caused by the reflecting points on or within the objects, at different positions in the path of propagation of said at least one pulse, said means having three or more sparsely spaced receiver elements each of which receives the echoes;

(c) A means for sampling said echoes at each of said receiver elements so as to form a time sequence of the echo samples from each receiver element;

(d) A means for combining the samples from the sequence of echo samples with each other and with the data in memory locations, within data or display memory, so as to form an image of the points residing at each different position within said three dimensional volume, comprising:

(aa) A means for determining, for an echo sample from a receiver element, the reconstructed image points in the data memory or the display memory into which said sample should be combined, comprising:

(aaa) A means for generating memory addresses which determine in which memory locations data will be accessed, said means using the equations or results of equations of a beamforming algorithm or reconstruction algorithm to cause said addresses to be generated;

(bb) A means for combining the data with the echo sample and replacing the data in the memory locations with the results of the combination;

(cc) A means for repeating (aa) and (bb) sequentially and or simultaneously for all image points to be formed using echo samples from the echo time sequences from a plurality of the receiver elements.

4. A method for creating the image points, pixels or voxels of an image of the reflecting points within a three dimensional volume containing reflecting points, said method being capable of creating the image after the transmission of a single pulse of energy, comprising the steps of:

(a) Transmitting at least one pulse of energy which will propagate with a known velocity through the three dimensional volume encountering each of the reflecting points;

(b) Receiving echoes, propagating with a known velocity, caused by the reflecting points, with three or more receiver elements of a sparse array of three or more receiver elements;

(c) Sampling the echoes to create a time sequence of the echo samples from each of the receiver array elements;

(d) Combining the samples from the different receiver elements to create an image of the reflecting points.

5. The device according to claims 1, 2, or 3 wherein the generated pulse is an acoustic pulse.

6. The device according to claim 1, 2, or 3 wherein the generated pulse is a unipolar pulse.

7. The device according to claim 6 wherein there are echo buffer memories into which echoes from multiple redundant transmissions are combined before the image is reconstructed whereby the signal to noise ratio is increased.

8. The device according to claim 7 wherein there are multiple transmitters each of which generates at least one transmitted pulse, and the echoes from each transmitted pulse are received by the receiver array before the image is completely reconstructed.

9. The device according to claim 8 wherein the generated pulse is an acoustic pulse.

10. The device according to claim 9 wherein there is provided a means for viewing the reconstructed three dimensional image on a two dimensional display and wherein the three dimensional image can be viewed from different user selectable perspectives.

11. The device according to claim 10 wherein there is provided a means for reconstructing the images directly into a two dimensional display memory without an intermediate data memory.

12. The device according to claim 11 wherein there is provided a means for recording the contents of the echo buffer memory on a recording device and also for loading the echo buffer memory from a recording device so that images may be reconstructed from the data that was stored on the recording device.

13. The device according to claim 12 wherein there is provided a means for extracting tomographic images from any orientation and position within the imaged three dimensional volume.

14. The device according to claim 8 wherein the generated pulse is an electromagnetic pulse.

15. The device according to claim 14 wherein the generated pulse is a pulse of light.

16. The device according to claim 15 wherein the generated pulse is a pulse of laser light.

17. The device according to claim 8 wherein the generated pulse is a burst of material particles.

18. The device according to claim 17 wherein the generated pulse is a burst of subatomic or atomic particles.

19. The device according to claim 8 wherein the generated pulse is an underwater acoustic pulse and the echoes are received by a sparse array of sonobouys.

20. The device according to claim 8 wherein the generated pulse is an acoustic pulse transmitted in air.

21. The device according to claims 1, 2 or 3 wherein multiple transmitters are used with multiple redundant pulses.

22. The device according to claim 21 wherein the generated pulse is an electromagnetic pulse.

23. The device according to claim 22 wherein the electromagnetic pulse is a radar pulse.

24. The method according to claim 4 wherein multiple pulses are generated with different transmitters, the echoes, due to a particular transmitter's transmitted pulse, received at the array of receiver elements are combined to form an image of reflecting points, and the images formed from each transmitter's echoes combined to form a resulting image with increased signal to noise ratio and reduced sidelobe levels.

* * * * *